(No Model.) 7 Sheets—Sheet 1.

M. E. REISERT.
AUTOMATIC GRAIN SCALE.

No. 376,679. Patented Jan. 17, 1888.

Witnesses:
H. W. T. Jenner
C. T. Beer

Inventor:
Michael Eduard Reisert
By Paine & Ladd
Attys.

(No Model.)  7 Sheets—Sheet 2.

M. E. REISERT.
AUTOMATIC GRAIN SCALE.

No. 376,679.  Patented Jan. 17, 1888.

Witnesses:
H. W. T. Jenner
C. T. Belr

Inventor:
Michael Eduard Reisert.
By Paine & ___,
Atty's.

(No Model.) 7 Sheets—Sheet 3.
M. E. REISERT.
AUTOMATIC GRAIN SCALE.

No. 376,679. Patented Jan. 17, 1888.

Witnesses:
H. W. T. Jenner
C. P. Beer

Inventor:
Michael Eduard Reisert.
By Paine & Ladd,
Atty's.

(No Model.) 7 Sheets—Sheet 4.

M. E. REISERT.
AUTOMATIC GRAIN SCALE.

No. 376,679. Patented Jan. 17, 1888.

Witnesses:
H. W. T. Jenner
C. T. Beer

Inventor:
Michael Eduard Reisert.
By Paine & Ladd,
Attys.

(No Model.) 7 Sheets—Sheet 5.
M. E. REISERT.
AUTOMATIC GRAIN SCALE.
No. 376,679. Patented Jan. 17, 1888.

Witnesses:
H. W. T. Jenner.

Inventor:
Michael Eduard Reisert
By Paine —,
Attys.

(No Model.) 7 Sheets—Sheet 6.

M. E. REISERT.
AUTOMATIC GRAIN SCALE.

No. 376,679. Patented Jan. 17, 1888.

Witnesses:
H. W. T. Jenner
C. O. Peer

Inventor:
Michael Eduard Reisert.
By Paine & Ladd,
Att'ys.

N. PETERS, Photo-Lithographer, Washington, D. C.

(No Model.)  
7 Sheets—Sheet 7.
M. E. REISERT.
AUTOMATIC GRAIN SCALE.
No. 376,679. Patented Jan. 17, 1888.
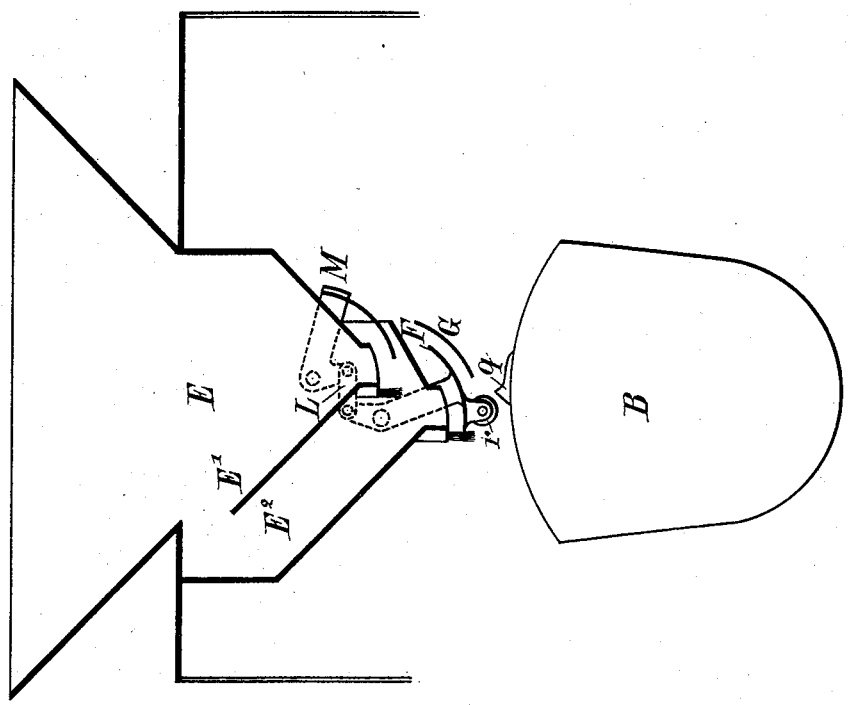
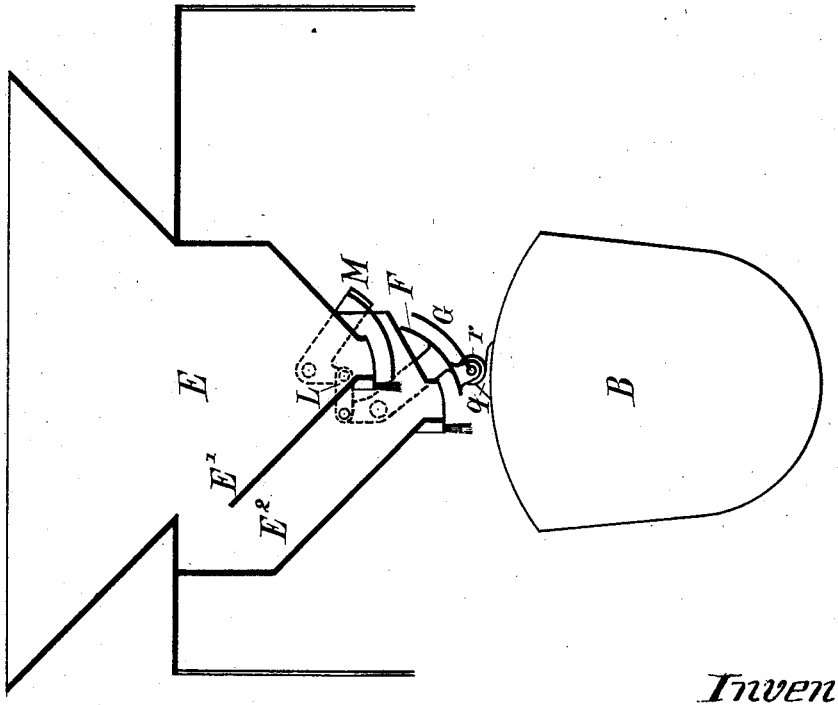
Witnesses:
H. W. T. Jenner.
C. T. Beer.
Inventor:
Michael Eduard Reisert.
By Paine & Ladd,
Atty's.

UNITED STATES PATENT OFFICE.

MICHAEL EDUARD REISERT, OF HENNEF, GERMANY, ASSIGNOR TO HENNEFER MASCHINENFABRIK C. REUTHER & REISERT, OF SAME PLACE.

AUTOMATIC GRAIN-SCALE.

SPECIFICATION forming part of Letters Patent No. 376,679, dated January 17, 1888.

Application filed May 26, 1886. Renewed May 3, 1887. Serial No. 236,970. (No model.)

*To all whom it may concern:*

Be it known that I, MICHAEL EDUARD REISERT, a subject of the German Emperor, and a resident of Hennef, in the German Empire, have invented certain new and useful Improvements in Automatic Scales, of which the following is a specification.

My invention relates to improvements in scales or balances in which the weight of material passing the same is automatically registered; and the objects of my improvements are, first, to increase the exactness; second, to obtain a short, steady, and regular motion of the scale-beam; third, to secure the working of the balance; fourth, to prevent all fraudulent influences from outside; and, fifth, to provide means for a regular supply of material during the last equipoise moments. I attain these objects by the mechanism illustrated in the accompanying drawings, in which—

Figure 1:
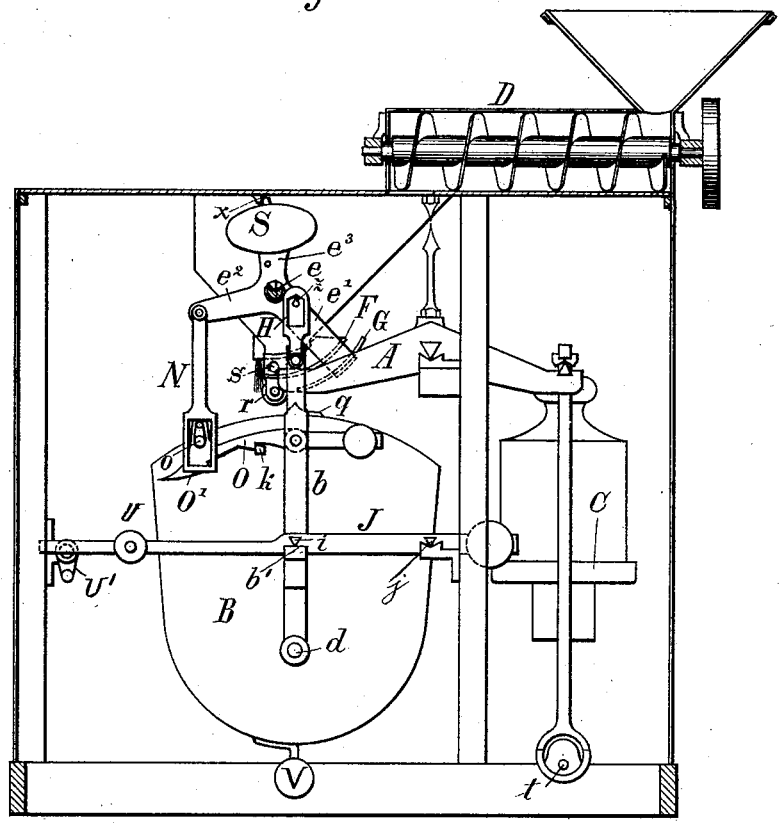
Figure 13:
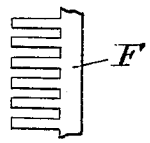
Figure 2:
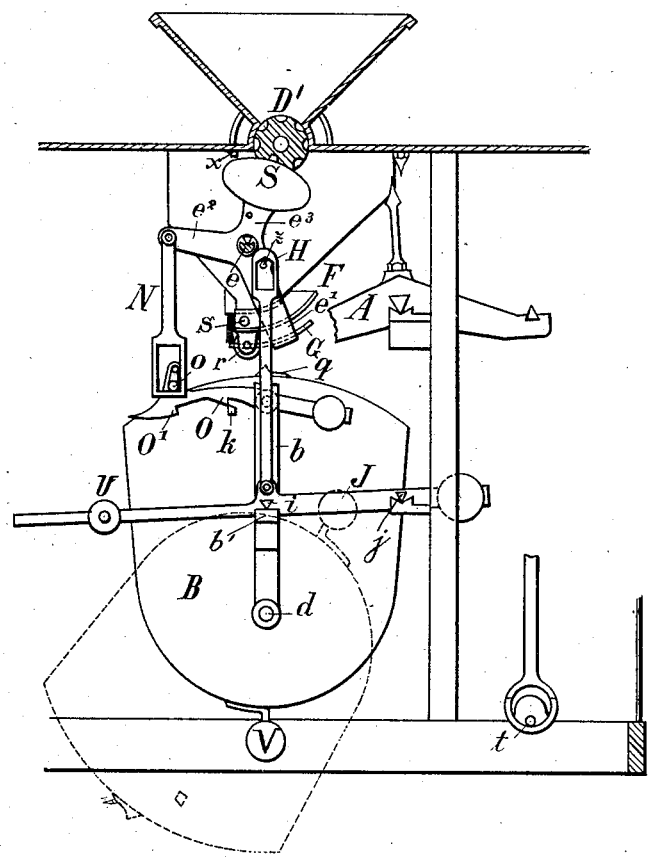
Figure 3:
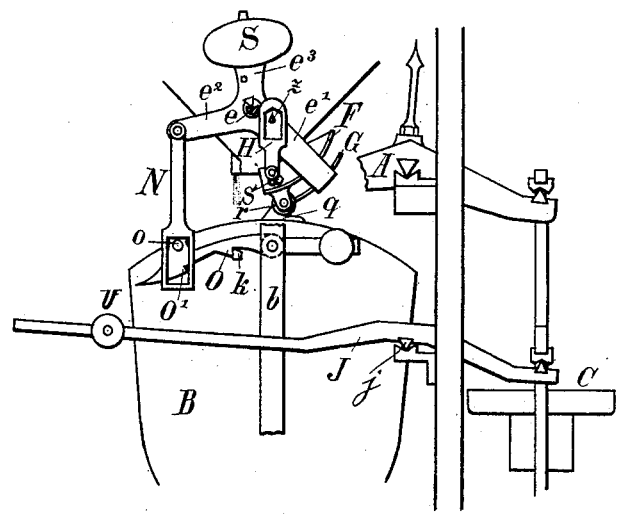
Figure 4:
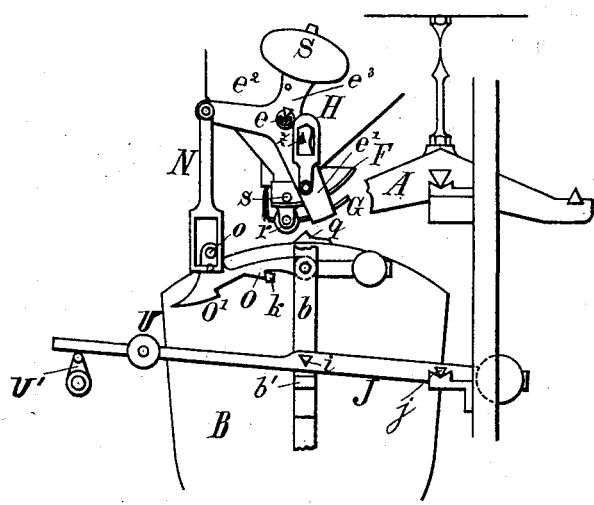
Figure 5:
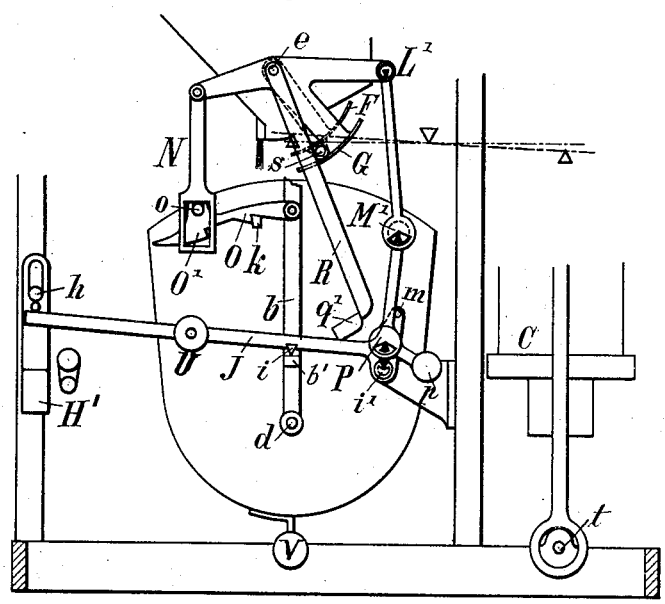
Figure 6:
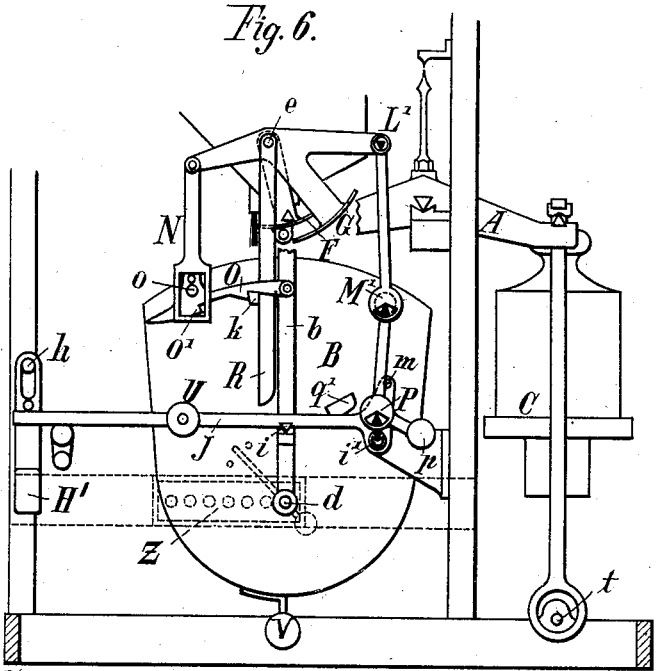

Figure 1 is a side elevation of the weighing apparatus during the balancing period. Fig. 2 is a side elevation, partly in section, just after the balancing is reached. Fig. 3 shows the essential parts of the mechanism at the beginning of the weighing period, and Fig. 4 shows the same parts when the proper working of the apparatus is controlled. Figs. 5, 6, 7, 8, 9, and 10 illustrate modifications of the weighing mechanisms, and Figs. 11 and 12 are enlarged sections of the device for securing a proper supply during the last moments of balancing. Fig. 13 is a plan view of a portion of the flap F.

Similar letters refer to similar parts throughout the several views.

The balance is provided with a common scale-beam, A, which can equilibrate when the scales are empty as well as if charged. The two flaps F and G close the supply-funnel. The flap F serves to reduce the supply of the material to be weighed to fine rays, which enter through slits provided in the flap into the receptacle B before the latter is entirely filled with the quantity balancing the weight placed upon the weight-scale. The other flap, G, closes entirely the supply-funnel as soon as the beam is in the state of equilibrium. This second flap, G, serves for a double purpose—viz., it has to effect the entire closing of the supply-funnel, and it has to cause the emptying of the receptacle B after the supply has discontinued.

The flap G is attached to a three-armed lever, $e'$ $e^2$ $e^3$, pivoted at $e$. The arm $e^3$ of the latter is provided with a counter-weight, S, which bears normally against a stop, $x$.

H is a link which rests upon the knife-edge $z$, projecting from the arm $e'$. The lower end of this link may be connected to the bearing-rod $d$ of the receptacle B, as shown in Fig. 1; or it may be connected to a lever, I, which oscillates with the balances, as shown in Fig. 2.

When the flap G is open, the weight S lies to the left of the pivot $e$ and bears against the stop $x$.

N is a link suspended from the arm $e^2$ to permit the emptying of the receptacle by raising the pin $o$ and hook O when the supply-funnel is entirely closed.

J is a lever pivoted on knife-edges $j$, and provided with the adjustable counter-weight U. This lever has a knife-edge, $i$, which presses upon a projection, $b'$, on the rod $b$ and causes, conjointly with the flap G, the premature closing of the supply-funnel.

The receptacle B is provided with a projection, $q$, which presses upon a roller, $r$, connected to the flap F, and opens and closes the flap when the receptacle, which turns on its axis $d$, is tilted. The axis $d$ of the receptacle is not placed directly beneath the center of gravity of the loaded receptacle, but a very little to one side, just sufficient to cause the receptacle to tilt of its own accord when loaded and not held by the hook and pin.

The knife-edge $i$ always rests upon the projection $b'$; but, if desired, it can be raised clear of the projection by turning the crank U' into the position shown in Fig. 4 and allowing the end of lever J to rest upon it.

The operation of the machine is as follows: When the receptacle B is empty, the weight in scale-pan C raises it and the stop $q$ holds the flap F open. The flap G is also open and the weight S is against the stop $x$. The link H is raised and is not in contact with the knife-edge $z$. The catch $k$ on the receptacle is held by the hook O, which prevents the receptacle from tilting over. This position of the machine is shown in Fig. 3. The material now runs from the hopper into the receptacle, which gradually descends, and with it the link H and projection $q$. The flap F closes by its own weight as soon as the roller $r$ can pass the projection $q$, and the material can then pass only through the slits in the said flap. About this time the link H touches the knife-edge $z$. This position of the mechanism is shown in Fig. 1. The continued downward motion of the receptacle and link H, due to the material passing through the slits in the flap F, causes the said link to press on the knife-edges $z$ and pull down the arm $e'$. This moves the weight S from the stop $x$ until it is over the center of the pivot $e$. The weight then falls suddenly into the position shown in Fig. 2. The flap G closes the hopper, and the link N lifts up the pin $o$ and hook O clear of the catch $k$ and allows the receptacle to fall over and empty itself.

V is a counter-weight for restoring the empty receptacle to its upright position. The projection $q$ bears on the roller $r$ and opens the flap F, and a pin, $s$, which projects from the side of said flap, presses upon the arm $e'$ and opens the flap G until the weight I passes over the center of the pivot $e$. The weight then falls against the stop $x$, holds the flap G wide open, and allows the hook O to engage with the catch $k$.

During the first part of the filling of the receptacle the lever J bears with all its weight upon the projection $b'$, and is then unbalanced by weight S, since the receptacle has not yet fallen at all and brought the link H into contact with the knife-edge $z$. During the last part of the filling, after the receptacle has sunk slightly, bringing the link H into contact with the knife-edge $z$, the weighted lever J balances not only the upward pressure of the knife-edge $z$, due to the weight S, until the said weight, in moving from the stop, has passed over the center of the pivot $e$, but it overcharges also the scale-beam, so that it gets into motion and causes the closing of the supply-funnel so much earlier, as would be required to balance the material still falling into the receptacle B after the scale-beam equipoises.

The weight of lever J then comes upon the receptacle and causes it to overbalance quickly. The same effect would also be produced by the lever J, as shown in Fig. 3, which is applied to raise the ascending scale instead of to depress the descending receptacle.

The counter-weight U may be moved back and forth upon the lever J, so that the receptacle may tilt over at the exact moment it is filled with a certain weight of material. The hook O is supplemented by an additional hook, O', which forms an extension of it. This hook O' will engage with the catch $k$ should the receptacle tilt over too soon or not turn back far enough for the hook O to engage with the said catch. The parts are so proportioned that the catch $k$ passes the hook O' before either of the flaps is opened. The pin $s$ also prevents the flap G from closing and the receptacle from tilting over if any obstruction should cause the flap F to stick and not operate properly.

Figure 7:
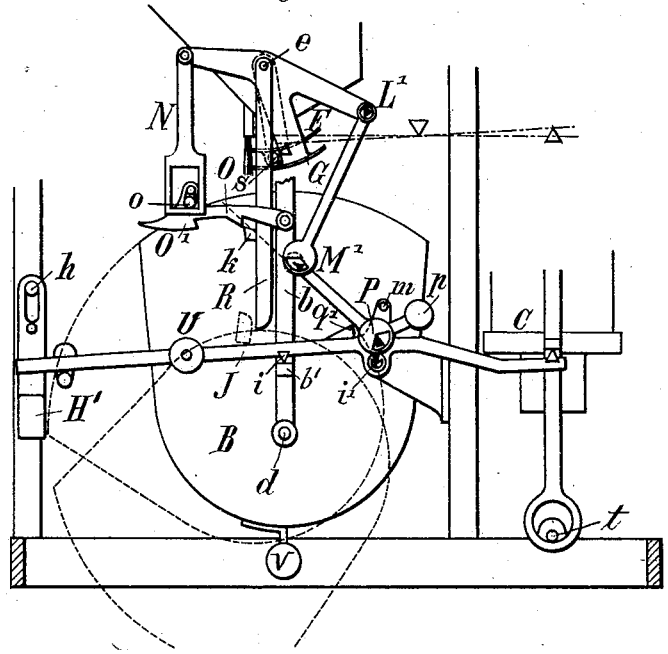
Figure 8:
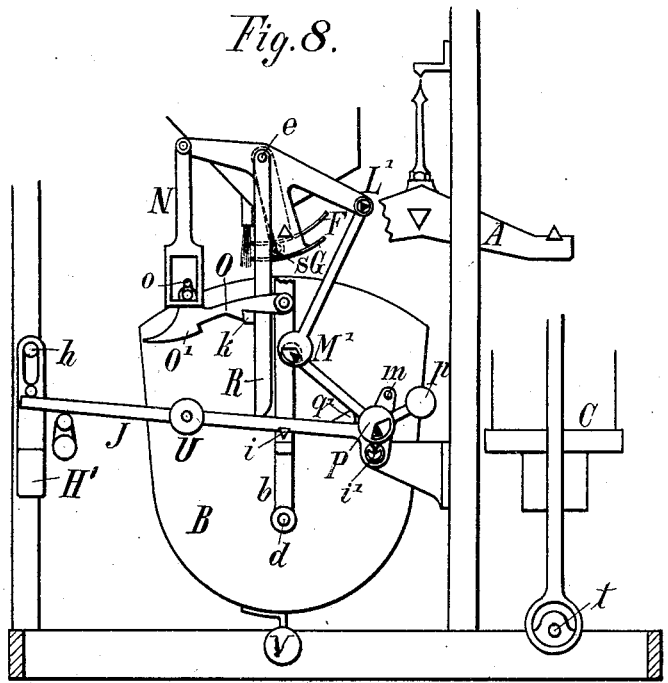

Figs. 5, 6, 7, and 8 show a device which may be used instead of the weight S to close the flap G and tilt over the receptacle. The flap G is here supported by the weight $p$, which operates through the toggles L' M' P, and also causes the link M' P of the toggle to bear against the pin $m$, which projects from an arm on lever J. This pin $m$ limits the further motion of the toggle in its direction. The projection $q$ may also be replaced by the projection $q'$ on the side of the receptacle, and for the roller $r$ may be substituted the lever R, pivoted at $e$, and which, by pressing on the pin $s$, operates in connection with the projection $q'$ in exactly the same manner as the roller $r$ operated with the projection $q$, and the flap F is opened and closed, as before described. When the projection $q'$ descends clear of lever R, the toggle is thrown over, as shown in Fig. 7, as soon as it passes its straight position. This is accomplished by its own weight, the weight of the flap G, and other parts connected thereto. The lever J also assists in bending the toggle by means of the pin $m$, which presses on the link M' P.

H' is a weight on the end of lever J. This weight rests upon the pin $h$ when the receptacle tilts over.

Figure 9:
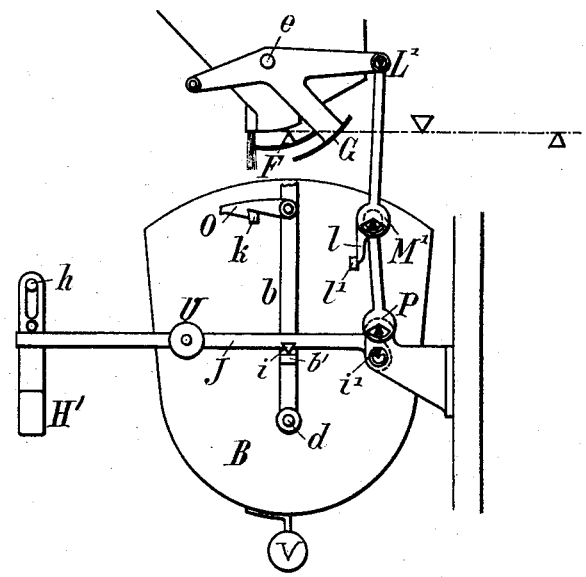
Figure 10:
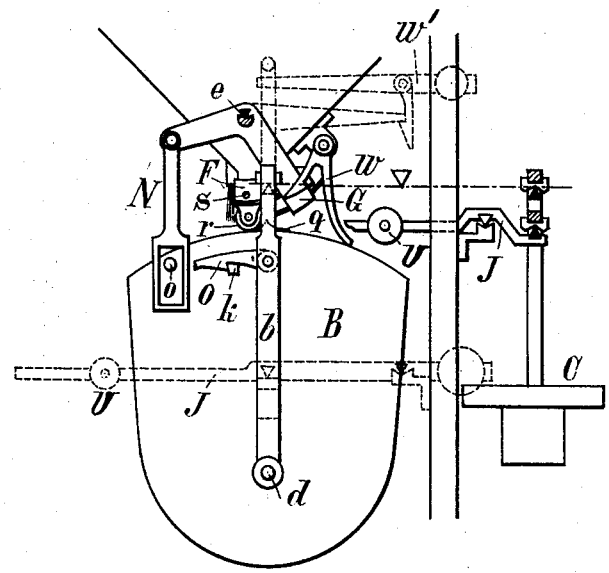

In Fig. 9 is shown a modification in the mechanism for operating the toggle. A finger, $l$, projects from the toggle at M' and bears upon a stop, $c'$, on the side of the receptacle. When the receptacle descends far enough, the stop leaves the finger and allows the toggle to bend in the direction in which it is already inclined, and the flap G closes by its own weight. According to another but less advantageous method, the flap G may close by its own weight, as shown in Fig. 10.

W is a pivoted catch which holds the flap G open until the downward movement of the end of lever J presses on the striker end of the catch and relieves the said flap. The catch may also be arranged as shown in dotted lines in Fig. 10 and lettered W'. The striker end of the catch is here operated by the supporting-link of the receptacle, and engages with a projection extending from the pivoted supporting-arm of the flap G.

Z is a counter, which indicates the number of discharges made by the receptacle.

The apparatus may be boxed in and, if desired, provided with a feeding mechanism, such as the conveyer D or the roller D'.

Figs. 11 and 12 show a device for preventing the delivery of a light charge to the receptacle when the supply in the hopper is so diminished as not to fill the slits in the flap F. This device consists of a reservoir, E, formed in the hopper, and a third flap, M. The reservoir E retains a supply of material, which it delivers after the closing of flap F, which is supplied from the division $E^2$, which is separated from the reservoir E by the partition E'.

L is a link which connects the flaps F and

M, so that the flap M opens when the flap F closes. If, therefore, the supply to flap F should be too little, it will be supplemented by that from reservoir E, which always retains a stock ready for delivery. The flap G is independent of this device. As soon as the flap F is opened again, the flap M closes automatically. A stop, $t$, limits the motion of the scale-beam.

Several features have been described and illustrated in the present case which are claimed or covered in a separate pending application of mine, and numbered 222,999, filed December 30, 1886, to which application attention is directed. The notable features of similarity are the tilting scale-beams and receptacles and the flaps F and G and devices for controlling the same.

I claim—

1. In an automatic weighing-scale, the combination of a receptacle, the rod $b$, with projection $b'$, upon which presses the knife-edge $i$ of the lever J, provided with an adjustable weight, the supply-flap G, with counter-weight S, mounted on pivot $e$, the knife-edge $z$, and a link connecting rod $b$ and the said knife-edge, arranged and operating substantially as and for the purpose hereinbefore specified.

2. In an automatic weighing-scale, the combination of a receptacle, the lever J, provided with an adjustable weight, the supply-flap G, with the counter-weight S, mounted on pivot $e$, the knife-edge $z$, and a link connecting lever J and the said knife-edge, arranged and operating substantially as and for the purpose set forth.

3. In an automatic weighing-scale, the combination of the three-armed lever $e'$ $e^2$ $e^3$, mounted on pivot $e$, the flap G, secured to arm $e'$, the weight S on arm $e^3$, the knife-edge $z$, a tilting receptacle provided with the catch $k$, a pivoted hook engaging with the catch, the link N, pivoted to arm $e^2$, the lever J, provided with an adjustable weight, and the link H, connecting the lever J either directly or by means of the rod $b$ with the knife-edge $z$, so that the said lever may be unbalanced by the weight S until the descent of the receptacle causes the said weight to suddenly cut off the supply of material, raise the hook O clear of the catch $k$, and allows the receptacle to fall over and empty itself.

4. In an automatic weighing-scale, the combination of a tilting receptacle provided with the projection $q$, the roller $r$, and the pin $s$, attached to the flap F, the said projection operating to bear on the said roller, the said pin pressing upon the arm $e'$ of the flap G and opening both supply-flaps when the emptied receptacle is tilted up.

In testimony that I claim the foregoing as my invention I have signed my name, in presence of two witnesses, this 22d day of March, 1886.

MICHAEL EDUARD REISERT.

Witnesses:
ALEXANDER SPECHT,
DIEDRICH PETERSEN.